(12) United States Patent
Johnson

(10) Patent No.: US 7,697,028 B1
(45) Date of Patent: Apr. 13, 2010

(54) VEHICLE MOUNTED SURVEILLANCE SYSTEM

(76) Inventor: Douglas M. Johnson, 10225 156 Street, #202, Edmonton, AB (CA) T5P 2R2

( * ) Notice: Subject to any disclaimer, the term of this patent is extended or adjusted under 35 U.S.C. 154(b) by 1476 days.

(21) Appl. No.: 10/874,601

(22) Filed: Jun. 24, 2004

(51) Int. Cl.
H04N 7/18 (2006.01)
H04N 7/00 (2006.01)
H04N 5/225 (2006.01)

(52) U.S. Cl. ............... 348/148; 348/143; 348/113; 348/152; 348/373; 348/374

(58) Field of Classification Search ............ 348/148, 348/373, 113, 118, 143, 152, 36–39
See application file for complete search history.

(56) References Cited

U.S. PATENT DOCUMENTS

| | | | | |
|---|---|---|---|---|
| 3,349,679 A * | 10/1967 | Lohman, III | ............ | 396/427 |
| 3,720,147 A * | 3/1973 | Bemis | ............ | 396/427 |
| 4,815,757 A * | 3/1989 | Hamilton | ............ | 280/764.1 |
| 4,833,932 A * | 5/1989 | Rogers | ............ | 74/5.1 |
| 5,012,335 A * | 4/1991 | Cohodar | ............ | 348/158 |
| 5,406,324 A | 4/1995 | Roth | | |
| 5,509,926 A * | 4/1996 | Mortazavi et al. | ............ | 607/19 |
| 5,561,498 A * | 10/1996 | Sekine et al. | ............ | 396/53 |
| 5,805,057 A * | 9/1998 | Eslaminovin | ............ | 340/426.12 |
| 5,841,971 A | 11/1998 | Longginou et al. | | |
| 6,002,326 A * | 12/1999 | Turner | ............ | 340/426.1 |
| 6,211,907 B1 * | 4/2001 | Scaman et al. | ............ | 348/148 |
| 6,373,521 B1 * | 4/2002 | Carter | ............ | 348/144 |
| 6,389,339 B1 * | 5/2002 | Just | ............ | 701/33 |
| 6,392,564 B1 * | 5/2002 | Mackey et al. | ............ | 340/937 |
| 6,509,926 B1 * | 1/2003 | Mills et al. | ............ | 348/143 |
| 6,630,884 B1 * | 10/2003 | Shanmugham | ............ | 340/436 |
| 6,690,268 B2 * | 2/2004 | Schofield et al. | ............ | 340/438 |
| 2001/0005804 A1 * | 6/2001 | Rayner | ............ | 701/35 |
| 2002/0113875 A1 | 8/2002 | Mazzilli | | |
| 2002/0138847 A1 | 9/2002 | Abrams et al. | | |
| 2003/0016288 A1 * | 1/2003 | Kaylor et al. | ............ | 348/149 |
| 2003/0038756 A1 * | 2/2003 | Blume et al. | ............ | 345/36 |
| 2003/0038814 A1 * | 2/2003 | Blume | ............ | 345/585 |
| 2003/0041329 A1 * | 2/2003 | Bassett | ............ | 725/105 |
| 2004/0233284 A1 * | 11/2004 | Lesesky et al. | ............ | 348/148 |
| 2007/0130599 A1 * | 6/2007 | Monroe | ............ | 725/105 |

* cited by examiner

Primary Examiner—Marsha D Banks Harold
Assistant Examiner—Jessica Roberts

(57) ABSTRACT

A security system for recording information outside a vehicle and delivering such information to a remote location includes a plurality of cameras mounted within a housing with radial lines of sight for providing a panoramic view of the surroundings. The present invention further includes a communication mechanism for transmitting an image to a remote location. A user interface includes one of a hand-operable video phone, personal computer and cellcorder. The present invention further includes an image stabilizing mechanism for maintaining the lines of sight along a linear path. The image stabilizing mechanism is secured to the housing and cameras. Such an image stabilizing mechanism includes a housing that has a motor, a gyro, and a helical spring member, which provide support as the vehicle is in motion.

12 Claims, 4 Drawing Sheets

VEHICLE MOUNTED SURVEILLANCE SYSTEM

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a surveillance system and, more particularly, to a vehicle-mounted surveillance system including a stabilizing mechanism for providing a steady image stream during vehicle motion.

2. Prior Art

Very often vehicles are operated by persons other than their owners. In those situations the owners normally have a vested interest in seeing that their vehicles are operated in a safe and prudent manner. For example, the backs of trucks are often marked, "How is my driving? Call (a certain telephone number)." Rental car companies also have an interest in seeing that their cars are not mishandled. Government agencies too sometimes need to maintain surveillance on the operation of their law enforcement vehicles, especially with the heightened threat of terrorist activities.

As opposed to organizations with substantial resources, individuals have a far more limited means available to them for this purpose. Thus parents, for example, have had to rely on word of mouth reports as to how their adolescent children drive a family car. Thus a need has long existed for a way of monitoring the driving of adolescent children which is cost effective, both in terms of equipment and time efficiency, and yet which may be achieved with reasonable cost economy.

Traditionally, surveillance is done using a system that photographs subjects at remote locations and transmits data representative of the photograph to a base location. As concerns over security increase, more locations, such as automatic tellers (ATMs), have incorporated a photographic identification system in order to deter thefts and unlawful acts. Such systems make routine surveillance images of subjects as they present themselves at the location to be protected. By storing images of persons as they present themselves at a location, they are less likely to commit a crime since the image has "pre-witnessed" them.

Images accumulated by a surveillance system are stored on video tape or by other means for later processing. In the event that a wrongful act occurs at a remote location in which images are collected, the images can be cross matched to the approximate time of the act and the identity of the subject, based upon reviewed images can be ascertained.

While the above-described surveillance systems have become increasingly common at permanent fixed locations, the use of such surveillance in mobile applications has been more problematic. It can prove difficult and unreliable to store the images on board a vehicle since they are prone to tampering. A typical environment in which surveillance of subjects may be particularly desirable is in the taxicab industry. The ability to remotely store images of passengers, before or as they enter a vehicle or surrounding building structure, would invariably serve to deter would-be thieves from carrying out their plans.

Accordingly, a need remains for a vehicle mounted surveillance system that overcomes the above-noted shortcomings, especially for overcoming terrorist activities in vulnerable areas of the world. This invention will be beneficial to Neighborhood Watch Programs and the Amber Alert Program for missing children. This invention is also designed to provide personal safety and give owners and family members peace of mind through knowing that the area around their vehicle is safe before they arrive there. In situations where the owner is apprehensive about walking to his/her parked car (during the daytime of nighttime), he/she can use the hand operated video phone to survey the surroundings from a distance. If anything is amiss, they can contact police if necessary.

BRIEF SUMMARY OF THE INVENTION

In view of the foregoing background, it is therefore an object of the present invention to provide a vehicle mounted surveillance system. These and other objects, features, and advantages of the invention are provided by a security system for recording information external and proximate a vehicle and delivering such information to a remote location. Such a system includes a housing with a generally dome shape, which is removably attachable to a select portion of a vehicle. The housing is preferably formed from plastic or glass and has a translucent portion and a plurality of opaque portions spaced thereabout. Such a translucent portion allows a plurality of cameras (described herein below) to view exterior of a vehicle. Conversely, the plurality of opaque portions help conceal the image stabilizing mechanism from the public.

This invention is designed primarily with the intent to enable the everyday, ordinary man and woman, with the ability to alleviate the feeling of helplessness derived from the "big brother" syndrome, that dictates "only the government is able to do surveillance." The invention will empower every citizen with the hands-on ability to protect their own personal safety, the safety of their families, their property and their neighborhood through the ability to perform their own personal surveillance. Importantly, this invention will also allow them to take part in the Amber Alert for Missing Children.

But, in times of emergency (such as terrorism), unlike satellite surveillance or systems that provide a vertical view, the GPS in the "cellcorder," mounted inside the vehicle, will allow the authorities and/or homeland security to piggyback on (the cellular signal generated by this invention to take a horizontal look during times of crisis—or any other time surveillance is required-only if such government surveillance is approved by a court of law.

This invention is designed primarily to be operated by a video phone or personal computer. This system comprises four small cameras (four day time camera's and four night-vision cameras) and an electronic "cellcorder," which is comprised of a digital recorder, a cell phone and a viewing screen all in one. The cellcorder is the brains of the device and is the access point for a video phone or PC. The cellcorder can also access the system from inside the car. Cameras are mounted in a small dome on top of the vehicle's roof. Cameras provides a 360 degree view of the area around the vehicle. The inside portion of the dome has four hanging struts and ball joints. The low ends of the joints connect to the top of the four-way day cameras, with the four-way night vision camera's directly underneath them.

The bottom features a gyroscope, electric motor and spring mount to maintain the smooth image. When the car is parked on an incline, the weight of the image stabilizer acts as a plumb-bob to level the cameras (this is why the cameras are hung from above—to take advantage of the leveling plumb-bob effect of the image stabilizer).

When the vehicle is in motion the gyroscope is activated (the apex of the image stabilizer rotates at high RPM to provide smooth recording and viewing while the vehicle is in motion). Images can be viewed inside the car on the cellcorder or by remote access from a video cell phone or personal computer.

In cases where the owner is apprehensive about walking to their parked car (day or night time) he or she could use the videophone to survey the surrounding area from a distance; if anything is amiss the owner can switch over to another line while the live view is on hold and contact the police. If necessary, the owner can link the two lines and let the police view what is happening. Night vision cameras are activated automatically after dark.

To access images the owner will call the cellcorder inside the car by videophone or PC, enter a PIN number to activate the system and obtain a view of all four directions simultaneously. By entering a key on the cellcorder, videophone or PC, the owner can select one of the four cameras and zoom-in while maintaining the other three cameras in a default perspective. The four cameras can function in any combination of the zoom-in or default setting simultaneously.

The owner can set the cellcorder to record, either while viewing or when the videophone or PC is turned off. The cellcorder records two frames per second. The owner may also call periodically and access the system to view the previous ten minutes of footage at fast forward (without interfering with the ongoing recording) to see what has occurred while he/she are away from the vehicle. The system can also be operated remotely from home using a PC or TV (via the internet) to keep an eye on their children at play.

There are other advantages to having this invention, such as viewing the traffic situation before leaving the office or to document a theft, vandalism or auto accident while the vehicle is parked. While the vehicle is being driven, if an accident occurs, the system will monitor which driver is right or wrong, thereby likely reducing insurance costs.

Advantageously, the present invention further includes a plurality of cameras mounted within the housing that include a plurality of lenses with respective lines of sight radially offset in a plurality of quadrants so that an operator can view a panoramic view of the surrounding areas.

The present invention further includes a communication mechanism for transmitting a recorded image in real time to a remote location. Such a communication mechanism is electrically coupled to the plurality of cameras. The communication mechanism may include a communication channel selected from the group consisting of a cellular telephone network, a local area network, a wide area network, global positioning satellite network and Internet.

The present invention further includes a mechanism for providing a user interface so that the system can be toggled between operating and non-operating modes. Such a user interface mechanism is wirelessly coupled to the communication mechanism and preferably includes one of a hand-operable video phone, personal computer and cellcorder (defined as a combined cellular phone and digital video recorder).

Advantageously, the present invention further includes an image stabilizing mechanism for assisting to maintain the respective lines of sight along a substantially linear path. Such an image stabilizing mechanism is automatically activated when vehicle movement is initiated.

The image stabilizing mechanism further includes a plurality of elongated struts having proximal and distal end portions respectively aligned along a substantially vertical plane. Furthermore, a plurality of ball bearings are secured to the proximal and distal end portions of the plurality of struts respectively. The image stabilizing mechanism further includes a plurality of ball joints secured to select portions of the housing and the plurality of cameras for receiving the plurality of ball bearings therein.

Such an image stabilizing mechanism further includes a housing that has a substantially square shape and is offset approximately 45 degrees from a vertical axis. The image stabilizing mechanism further includes a motor that has an elongated drive shaft extending outwardly therefrom along the vertical axis and disposed within the image stabilizing housing. A gyro that has an annular shape is engaged about the shaft and is selectively rotatable about the vertical axis.

A helical spring member vertically mounted to a bottom portion of the image stabilizing mechanism provides resilient support along the vertical axis as the vehicle is in motion.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
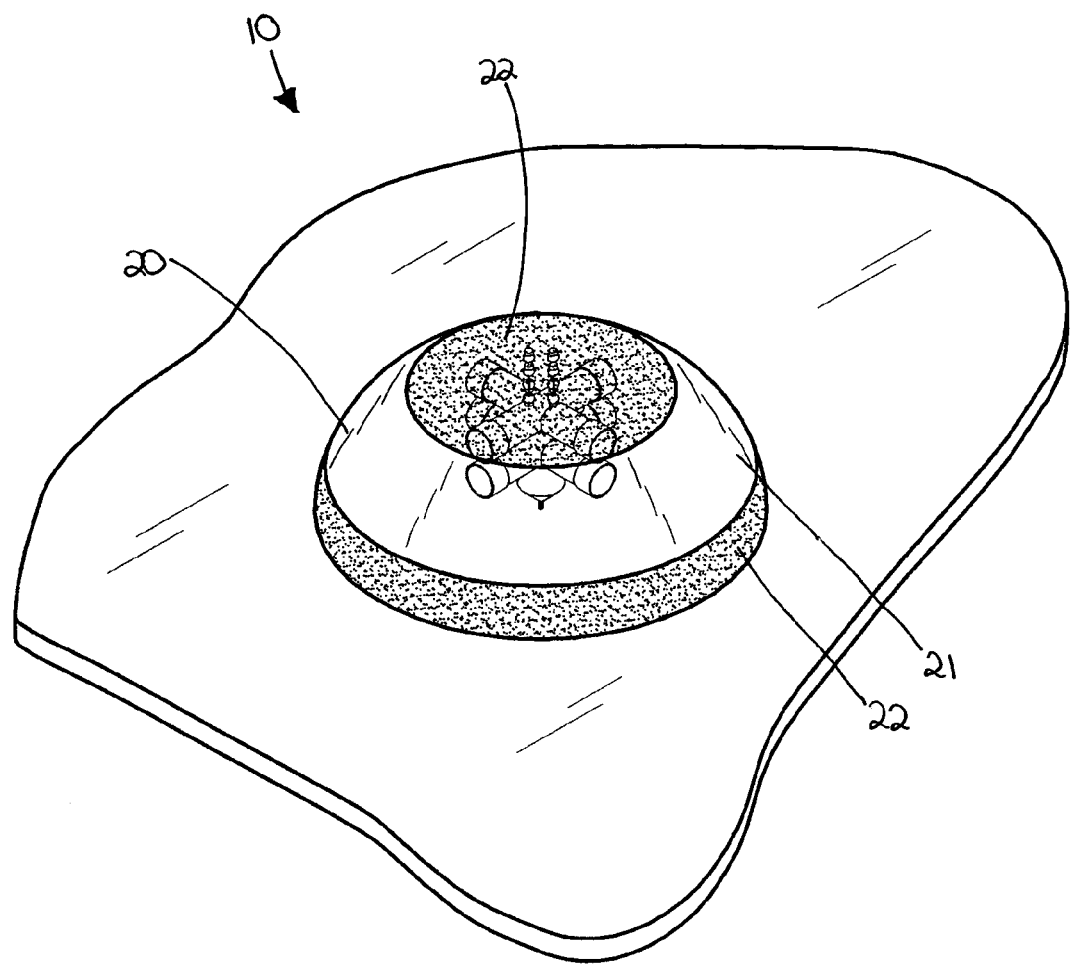
FIG. 1 is a perspective view showing the dome-shaped housing of a vehicle mounted surveillance system, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system of this invention is referred to generally in FIGS. 1-5 by the reference numeral 10 and is intended to provide security monitoring through a mounted surveillance system. It should be understood that the system 10 may be retrofitted on all types of vehicles for monitoring threatening activities such as theft, terrorism, and vandalism.

Referring initially to FIG. 1, the system 10 includes a housing 20 with a generally dome shape, which is removably attachable to a select portion of a vehicle. The housing 20 is preferably formed from plastic or glass and has a translucent portion 21 and a plurality of opaque portions 22 spaced thereabout. Such a translucent portion 21 allows a plurality of cameras 30 (described hereinbelow) to view exterior of a vehicle. Conversely, the plurality of opaque portions 22 help conceal the image stabilizing mechanism 40 from the public.

Figure 2:
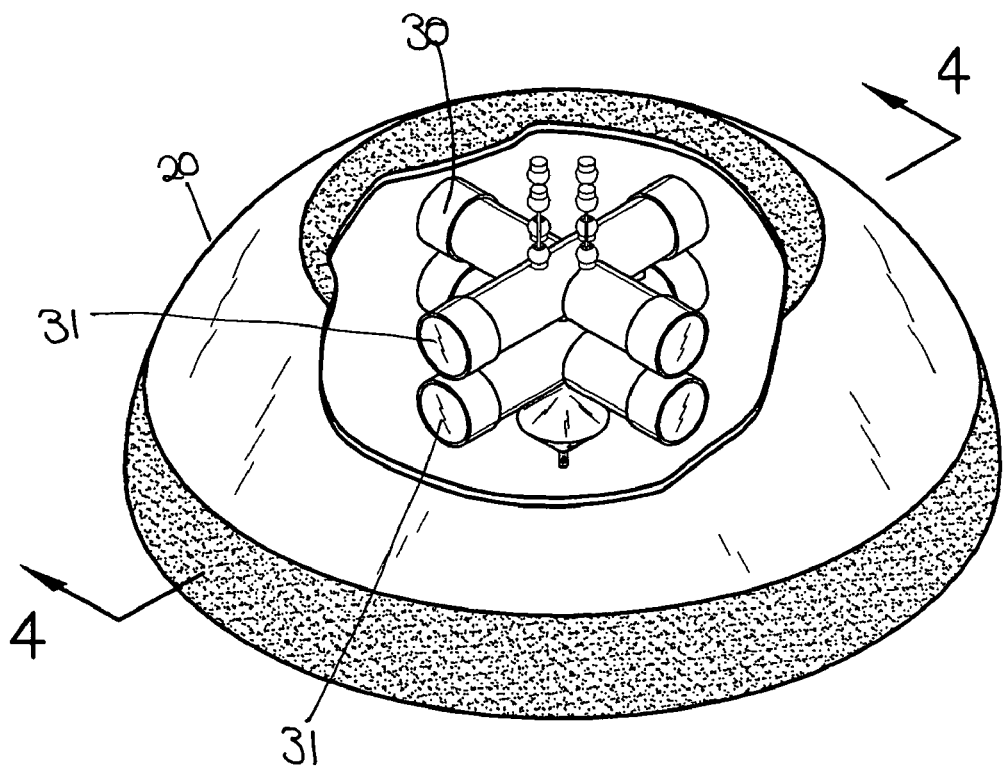
FIG. 2 is a partially enlarged exposed view of FIG. 1.
Figure 3:
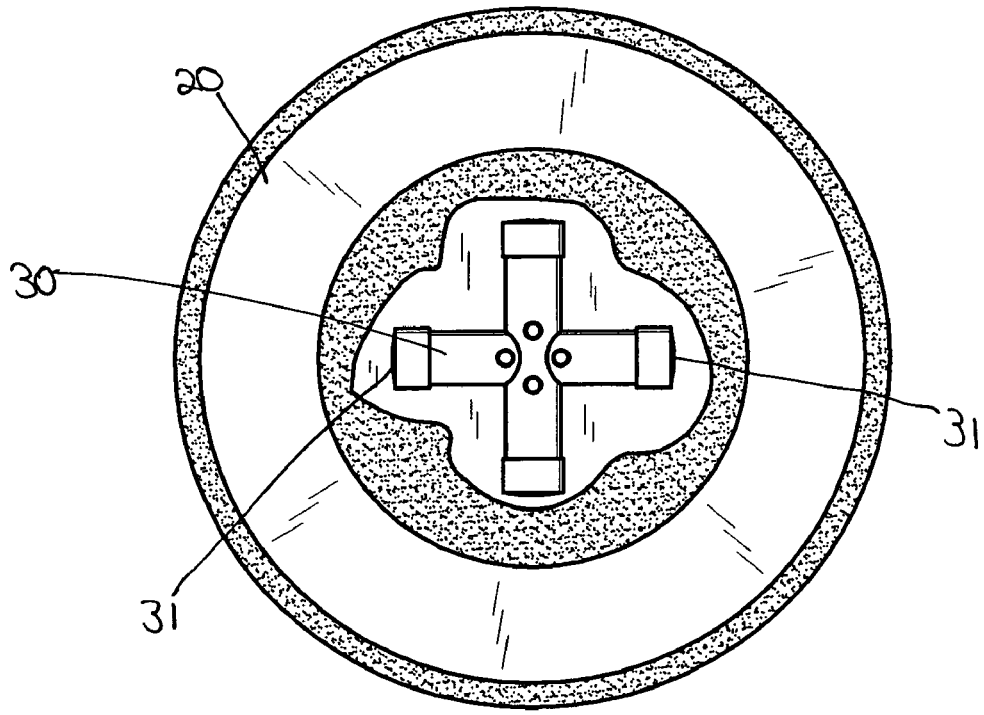
FIG. 3 is a partially exposed top plan view of FIG. 1.

Referring to FIGS. 2 and 3, the present invention advantageously includes a plurality of cameras 30 mounted within the housing 20 that include a plurality of lenses 31 with respective lines of sight radially offset in a plurality of quadrants so that an operator can view a panoramic view of the surrounding areas. The plurality of cameras 30 may include night vision members in addition to day members.

The present invention further includes a communication mechanism for transmitting a recorded image in real time to a remote location. Such a communication mechanism is electrically coupled to the plurality of cameras 30. The communication mechanism may include a communication channel selected from the group consisting of a cellular telephone network, a global positioning satellite network and the Internet. In times of emergency, the GPS in the 'cellcorder', mounted in the vehicle, will allow the authorities and/or homeland security to piggyback on this invention and take a horizontal look during time of crisis or at any time surveillance is required. Such a horizontal view is achieved in a manner well known to a person of ordinary skill in the art.

Figure 5:
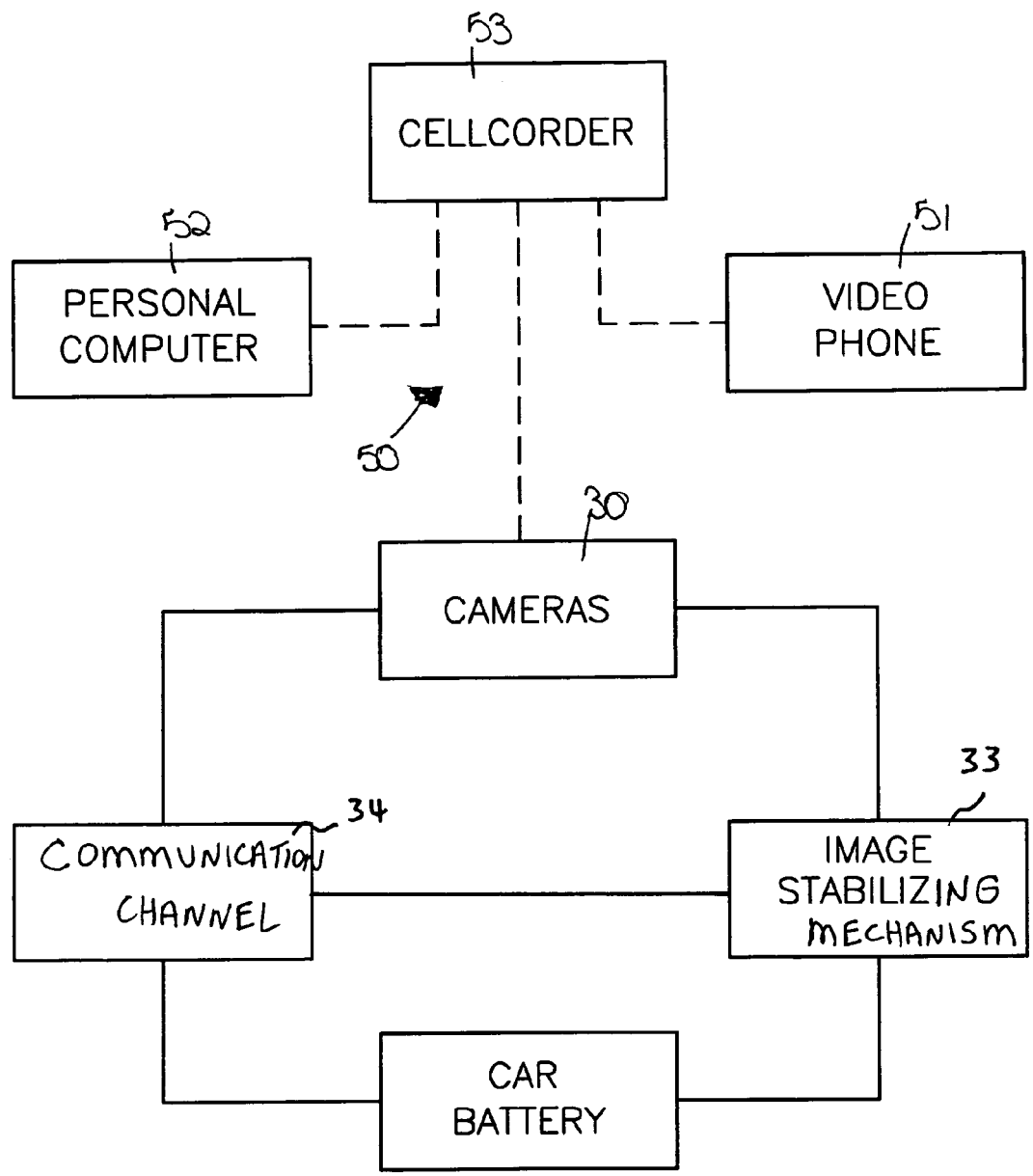
FIG. 5 is a schematic block diagram showing the relationship between the major components of the present invention.

Referring to FIG. 5, the present invention further includes a mechanism 50 for providing a user interface so that the system can be toggled between operating and non-operating modes. Such a user interface mechanism 50 is wirelessly coupled to the communication mechanism and preferably includes one of a hand-operable video phone 51, personal computer 52 and cellcorder 53 (combined cellular phone and digital video recorder). Such devices allow a user to view recorded images from a remote location. The cellcorder 53, hand-operable video phone 51, and personal computer 52 would also allow a user to zoom in on a particular camera view and isolate select images during operating conditions. In operation, the hand-operable video phone 51, personal computer 52 and cellcorder 53 requests a pin number for authorizing user access to the system 10 and can provide date and time of recorded images.

Figure 4:
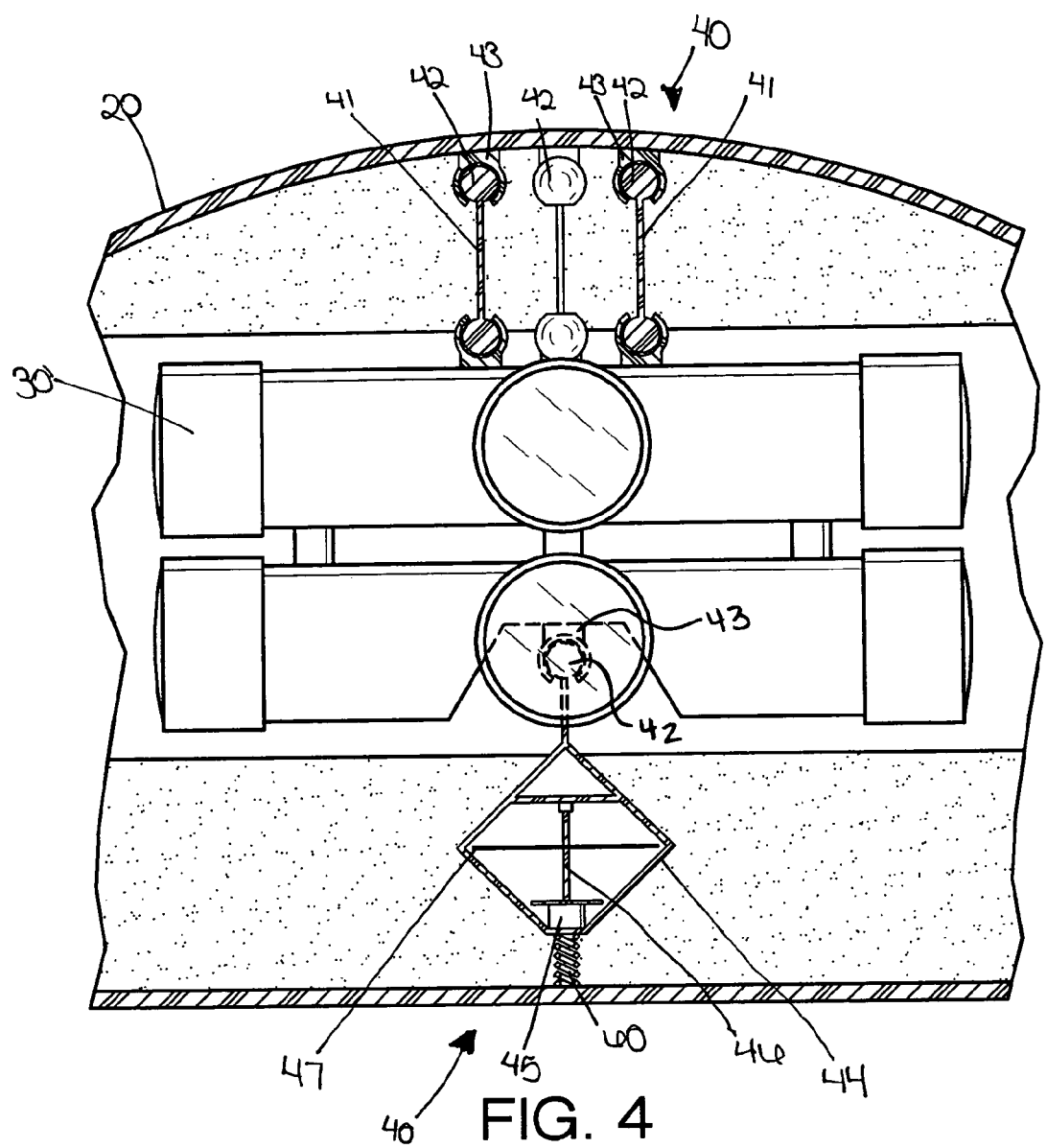
FIG. 4 is an enlarged cross-sectional view of the present invention shown in FIG. 1, taken along line 44.

Referring to FIG. 4, the present invention advantageously includes an image stabilizing mechanism 40 for assisting to maintain the respective lines of sight along a substantially linear path. Such an image stabilizing mechanism 40 is automatically activated when vehicle movement is initiated.

The image stabilizing mechanism 40 further includes a plurality of elongated struts 41 having proximal and distal end portions respectively aligned along a substantially vertical plane. Furthermore, a plurality of ball bearings 42 are secured to the proximal and distal end portions of the plurality of struts 41 respectively. The image stabilizing mechanism 40 further includes a plurality of ball joints 43 secured to select portions of the housing 20 and the plurality of cameras 30 for receiving the plurality of ball bearings 42 therein.

Such an image stabilizing mechanism 40 further includes a housing 44 that has a substantially square shape and is offset approximately 45 degrees from a vertical axis. The image stabilizing mechanism 40 further includes a motor 45 that has an elongated drive shaft 46 extending outwardly therefrom along the vertical axis and disposed within the image stabilizing housing 44. A gyro 47 that has an annular shape is engaged about the shaft and is selectively rotatable about the vertical axis, as best shown in FIG. 4.

A helical spring member 60 vertically mounted to a bottom portion of the image stabilizing mechanism 40 provides resilient support along the vertical axis as the vehicle is in motion. When it is necessary to park a vehicle on an incline, the weight of the image stabilizing mechanism 40 will act as a plumb bob to level the cameras 30 for continued quality surveillance of the area. When the vehicle is in motion, the gyro 47 in the image stabilizing mechanism 40 will be activated. The apex of the image stabilizing mechanism 40 will rotate up to 500 rpm to smooth out the recording and viewing while the vehicle is in motion.

The present invention is suited for new production vehicles as well as older vehicles. Law enforcement officers will find the present invention advantageous while investigating vehicular misconduct. Parents of new drivers may find the present invention useful for monitoring their child's driving behavior and location. The present invention would also be useful in a car accident situation to establish fault and liability with the authorities and insurance companies.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

This invention is designed primarily with the intent to enable the everyday, ordinary man and woman, with the ability to alleviate the feeling of helplessness derived from the "big brother" syndrome, that dictates "only the government is able to do surveillance." The invention will empower every citizen with the hands-on ability to protect their own personal safety, the safety of their families, their property and their neighborhood through the ability to perform their own personal surveillance. Importantly, this invention will also allow them to take part in the Amber Alert for Missing Children.

But, in times of emergency (such as terrorism), unlike satellite surveillance or systems that provide a vertical view, the GPS in the "cellcorder," mounted inside the vehicle, will allow the authorities and/or homeland security to piggyback on (the cellular signal generated by this invention to take a horizontal look during times of crisis—or any other time surveillance is approved by a court of law. Such a horizontal view is achieved in a manner well known to a person of ordinary skill in the art.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A security system for recording information external and proximate a vehicle and delivering such information to a remote location, said system comprising:

a housing having a dome shape and being removably attachable to a select portion of a vehicle;

a plurality of cameras mounted within said housing and comprising a plurality of lenses having respective lines of sight radially offset in a plurality of quadrants so that an operator can view a panoramic view of the surrounding areas;

communication means for transmitting a recorded image in real time to a remote location, said communication means being electrically coupled to said plurality of cameras;

means for providing a user interface so that said system can be toggled between operating and non-operating modes, said user interface means being wirelessly coupled to said communication means; and image stabilizing means for assisting to maintain said respective lines of sight along a substantially linear path;
wherein said image stabilizing means is automatically activated when vehicle movement is initiated;
wherein said image stabilizing means comprises
a plurality of elongated struts having proximal and distal end portions respectively and being aligned along a substantially vertical plane;
a plurality of ball bearings secured to said proximal and distal end portions of said plurality of struts respectively; and
a plurality of ball joints secured to select portions of said housing and said plurality of cameras and for receiving said plurality of ball bearings therein.

2. The system of claim 1, wherein said communication means comprises: a communication channel selected from the group consisting of a cellular telephone network, a global positioning satellite network and the Internet.

3. The system of claim 1, wherein said image stabilizing means further comprises:
a housing having a substantially square shape and being offset approximately 45 degrees from a vertical axis;
a motor having an elongated drive shaft extending outwardly therefrom along the vertical axis and disposed within the image stabilizing housing,
a gyro having an annular shape engaged about the shaft and being selectively rotatable about the vertical axis; and
a helical spring member vertically mounted to a bottom portion of said image stabilizing means for providing resilient support along the vertical axis.

4. The system of claim 1, wherein said housing is formed from plastic and has a translucent portion and a plurality of opaque portions spaced thereabout, said translucent portion allowing said plurality of cameras to view exterior of a vehicle and said plurality of opaque portions for concealing said image stabilizing means.

5. The system of claim 1, wherein said user interface means comprises: one of a hand-operable video phone, personal computer and cellcorder.

6. A security system for recording information external and proximate a vehicle and delivering such information to a remote location, said system comprising:
a housing having a dome shape and being removably attachable to a select portion of a vehicle;
a plurality of cameras mounted within said housing and comprising a plurality of lenses having respective lines of sight radially offset in a plurality of quadrants so that an operator can view a panoramic view of the surrounding areas, said cameras including first and second vertically stacked cameras disposed within said housing, each of said first and second cameras having first, second, third and fourth ones of said lenses that are equidistantly spaced apart in opposing directions such that corresponding ones of said first, second, third and fourth lenses are vertically aligned in same directions;
communication means for transmitting a recorded image in real time to a remote location, said communication means being electrically coupled to said plurality of cameras;
means for providing a user interface so that said system can be toggled between operating and non-operating modes, said user interface means being wirelessly coupled to said communication means; and
image stabilizing means for assisting to maintain said respective lines of sight along a substantially linear path, said image stabilizing means comprising
a plurality of elongated struts having proximal and distal end portions respectively and being aligned along a substantially vertical plane,
a plurality of ball bearings secured to said proximal and distal end portions of said plurality of struts respectively, and
a plurality of ball joints secured to select portions of said housing and said first camera and for receiving said plurality of ball bearings therein;
wherein said image stabilizing means is automatically activated when vehicle movement is initiated;
wherein said image stabilizing means further comprises
a housing having a substantially square shape and being offset approximately 45 degrees from a vertical axis;
a motor having an elongated drive shaft extending outwardly therefrom along the vertical axis and disposed within the image stabilizing housing,
a gyro having an annular shape engaged about the shaft and being selectively rotatable about the vertical axis; and
a helical spring member vertically mounted to a bottom portion of said image stabilizing means for providing resilient support along the vertical axis;
wherein said plurality of struts comprises a first strut, a second strut, a third strut, and a fourth strut;
wherein each of said first, second, third and fourth struts are registered parallel to said drive shaft of said motor respectively;
wherein said plurality of ball bearings comprises a first pair of ball bearings, a second pair of bearings, a third pair of ball bearings and a fourth pair of ball bearings respectively connected to each of said proximal and distal end portions of said first, second, third and fourth struts respectively;
wherein said first, second, third and fourth struts are equidistantly offset from a center of said first and second cameras such that each of said first and second cameras continuously remain at a plumb position, said plumb position being defined when each of said first, second, third and fourth lenses of each of said first and second cameras are aligned parallel to a rotating plane of said gyro respectively.

7. The system of claim 6, wherein said communication means comprises: a communication channel selected from the group consisting of a cellular telephone network, a global positioning satellite network and the Internet.

8. The system of claim 6, wherein said housing is formed from plastic and has a translucent portion and a plurality of opaque portions spaced thereabout, said translucent portion allowing said plurality of cameras to view exterior of a vehicle and said plurality of opaque portions for concealing said image stabilizing means.

9. The system of claim 6, wherein said user interface means comprises: one of a hand-operable video phone, personal computer and cellcorder.

10. A security system for recording information external and proximate a vehicle and delivering such information to a remote location, said system comprising:
a housing having a dome shape and being removably attachable to a select portion of a vehicle, said housing being formed from plastic and having a translucent portion and a plurality of opaque portions spaced thereabout, said translucent portion for allowing said plurality of cameras to view exterior of a vehicle and said plurality of opaque portions for concealing said image stabilizing means;
a plurality of cameras mounted within said housing and comprising a plurality of lenses having respective lines of sight radially offset in a plurality of quadrants so that an operator can view a panoramic view of the surrounding areas;

communication means for transmitting a recorded image in real time to a remote location, said communication means being electrically coupled to said plurality of cameras;

means for providing a user interface so that said system can be toggled between operating and non-operating modes, said user interface means being wirelessly coupled to said communication means; and image stabilizing means for assisting to maintain said respective lines of sight along a substantially linear path, said image stabilizing means comprising
- a plurality of elongated struts having proximal and distal end portions respectively and being aligned along a substantially vertical plane,
- a plurality of ball bearings secured to said proximal and distal end portions of said plurality of struts respectively, and
- a plurality of ball joints secured to select portions of said housing and said plurality of cameras and for receiving said plurality of ball bearings therein;

wherein said image stabilizing means is automatically activated when vehicle movement is initiated and is disposed inside of said dome shaped housing while remaining located subjacent to said cameras;

wherein said image stabilizing means further comprises
- a housing having a substantially square shape and being offset approximately 45 degrees from a vertical axis,
- a motor having an elongated drive shaft extending outwardly therefrom along the vertical axis and disposed within said image stabilizing means housing,
- a gyro disposed within said image stabilizing means housing and having an annular shape engaged about the shaft and being selectively rotatable about the vertical axis, and
- a helical spring member vertically mounted to a bottom portion of said image stabilizing means for providing resilient support along the vertical axis, said helical spring member being located outside of said image stabilizing means housing and further being compressible along a vertical plane;

wherein said gyro rotates when the vehicle is in motion for maintaining said cameras at a plumb position, said plumb position being defined when each of said cameras is aligned parallel to a rotating plane of said gyro respectively.

11. The system of claim 10, wherein said communication means comprises:

a communication channel selected from the group consisting of a cellular telephone network, a global positioning satellite network and the Internet.

12. The system of claim 10, wherein said user interface means comprises:

one of a hand-operable video phone, personal computer and cellcorder.

* * * * *